(12) United States Patent
Laudani

(10) Patent No.: US 11,338,834 B2
(45) Date of Patent: May 24, 2022

(54) LOWERED BIDIRECTIONAL TROLLEY

(71) Applicant: Pietro Laudani, Boleslawiec (PL)

(72) Inventor: Pietro Laudani, Boleslawiec (PL)

( * ) Notice: Subject to any disclaimer, the term of this patent is extended or adjusted under 35 U.S.C. 154(b) by 0 days.

(21) Appl. No.: 17/261,124

(22) PCT Filed: Jul. 23, 2018

(86) PCT No.: PCT/IT2018/000101
§ 371 (c)(1),
(2) Date: Jan. 18, 2021

(87) PCT Pub. No.: WO2020/021577
PCT Pub. Date: Jan. 30, 2020

(65) Prior Publication Data
US 2021/0291884 A1     Sep. 23, 2021

(51) Int. Cl.
*B62B 3/00* (2006.01)
*B62B 3/10* (2006.01)
*B62B 5/00* (2006.01)
*B60D 1/167* (2006.01)

(52) U.S. Cl.
CPC .............. *B62B 3/001* (2013.01); *B62B 3/008* (2013.01); *B62B 3/10* (2013.01); *B62B 5/00* (2013.01); *B60D 1/167* (2013.01); *B62B 2202/12* (2013.01); *B62B 2207/00* (2013.01)

(58) Field of Classification Search
CPC ........... B62B 3/001; B62B 3/008; B62B 3/10; B62B 5/00; B62B 2202/12; B62B 2207/00; B60D 1/167
See application file for complete search history.

(56) References Cited

U.S. PATENT DOCUMENTS

| 2,935,331 | A | * | 5/1960 | Ledgerwood | B62B 3/001 280/79.3 |
| 2005/0206106 | A1 | * | 9/2005 | Labadie | B60D 1/44 280/79.11 |
| 2019/0193495 | A1 | * | 6/2019 | Floyd | B60D 1/04 |

FOREIGN PATENT DOCUMENTS

| DE | 202004004972 U1 | * | 7/2004 | ............ B62D 61/10 |
| DE | 102014100865 A1 | * | 7/2015 | ................ B60P 1/02 |
| DE | 10150268 B4 | * | 11/2015 | ......... B60B 33/0073 |
| DE | 102014006342 A1 | * | 11/2015 | ............. B62D 63/06 |
| DE | 102015102150 A1 | * | 8/2016 | ............. B62D 63/06 |
| DE | 202017101758 U1 | * | 5/2017 | ........... B62D 63/068 |
| DE | 102016101490 A1 | * | 8/2017 | ........... B62B 5/0043 |

(Continued)

*Primary Examiner* — James A Shriver, II
*Assistant Examiner* — Ian Bryce Shelton
(74) *Attorney, Agent, or Firm* — R. Ruschena Patent Agent, LLC

(57) ABSTRACT

A bidirectional trolley (1) comprising a drawbar (Abstract2), two pivoting front wheels (6, 6') a push handle (3), a loading and unloading plan (4) for a box (5) for moving items. The bidirectional trolley comprises a rotary system (10), placed in the rear portion of the trolley (1), and comprising two non-pivoting wheels (8', 8") placed on the same horizontal axis, a pivoting wheel (8) placed at 45° with respect to the other two non-pivoting wheels (8', 8") and a hook (12), configured for assuming a resting position in which it is completely retracted under the plan (4) between the two non-pivoting wheels (8' and 8"), in order to permit to an operator to approach the most to the box (5) for moving items, for an easy unloading and loading of the box (5) itself.

5 Claims, 4 Drawing Sheets

(56) References Cited

FOREIGN PATENT DOCUMENTS

| | | | | |
|---|---|---|---|---|
| EP | E P-2236391 | A2 * | 10/2010 | ............. B62B 3/008 |
| EP | 2418137 | A1 * | 2/2012 | ............. B62B 3/001 |
| EP | 2570358 | A2 * | 3/2013 | ............. B65D 19/10 |
| EP | 2765054 | A1 * | 8/2014 | ........... B62B 5/0079 |
| EP | 3257720 | A1 * | 12/2017 | ............... B62B 3/02 |
| EP | 3305623 | A1 * | 4/2018 | ............. B62B 3/001 |
| FR | 2876957 | A1 * | 4/2006 | ............. B60D 1/167 |
| FR | 2966120 | A1 * | 4/2012 | ............. B60D 1/143 |
| FR | 2976892 | A1 * | 12/2012 | ........... B62B 5/0043 |
| GB | 2501771 | A  * | 11/2013 | ............. B62B 3/001 |
| JP | 2007030882 | A  * | 2/2007 | ........ B60B 33/0068 |
| KR | 20030015023 | A  * | 2/2003 | |
| WO | WO-2010134038 | A1 * | 11/2010 | ............. B62B 3/001 |
| WO | WO-2018154259 | A1 * | 8/2018 | ............... B60D 1/00 |

* cited by examiner

LOWERED BIDIRECTIONAL TROLLEY

BACKGROUND OF THE INVENTION

1. Field of the Invention

Subject of the present invention is an innovative lowered bidirectional trolley. in particular, the present lowered trolley is provided for the transport of containers loaded with materials, it permits an easy access for loading and unloading operations by an operator, both in the rear part and from two sides, as the container leaning on the trolley is moved to a very low position and this makes it accessible without being unloaded from the bidirectional trolley, furthermore, the trolley has also a greater operation in its handling through a rotary rear system, which reduces the number of maneuvers to be performed by the operator. the application field of this kind of trolleys is the industry utilizing industrial boxes, such boxes are moved along the production channels or the assembly lines, by means of a train of trolleys, as normally such trolleys must be loaded and unloaded by operators along a line, the access for the operator must be easy and the trolley must be easily moved along restricted areas, therefore, such trolleys in addition to being lowered must also be able to perform a bidirectional handling.

2. Brief Description of the Prior Art in the state of the art some examples of trolleys are known for handling industrial boxes which are commonly used in online production lines. on such trolleys industrial boxes are normally supported and the height of the trolley of the supported box on its feet is normally too great for an operator being able to easily unload the material contained inside the trolley without unloading the latter from the trolley, furthermore, trolleys of the known type are able to be moved only along two directions of travel, and for this reason their steering capacity is difficult and it is not possible to make the trolley being transversally moved with respect to the direction of travel, there is therefore a need to define a bidirectional trolley provided with can be easily moved, being connected online to other trolleys and easily accessible by an operator, so as to be easily loaded and unloaded by an operator.

SUMMARY OF THE INVENTION

Summary of the invention purpose of the present invention is a bidirectional trolley characterized by a reduced height for moving containers, which in such a way are easily accessible by an operator from three sides.

The subject of the present invention solves the technical problem of the difficult loading and unloading of materials from containers placed on such trolleys by the operator and of improving its handling, further purpose of the present invention is to obtain a greater maneuverability of trolley in working areas, as it is easily directed and therefore reduces the number of maneuvers during steering, the lowered bidirectional trolley is in fact able to make very tight bends, these and other purposes and advantages are achieved, according to the invention, by a lowered bidirectional trolley with the characteristics set forth in the annexed independent claim.

Further preferred and/or particularly advantageous embodiments of the invention are described according to the characteristics set forth in the annexed dependent claims.

BRIEF DESCRIPTION OF THE DRAWINGS

The invention will now be described with reference to the annexed drawings, which illustrate an example of a non-limiting embodiment, in which.

DETAILED DESCRIPTION OF THE INVENTION

Figure 6:
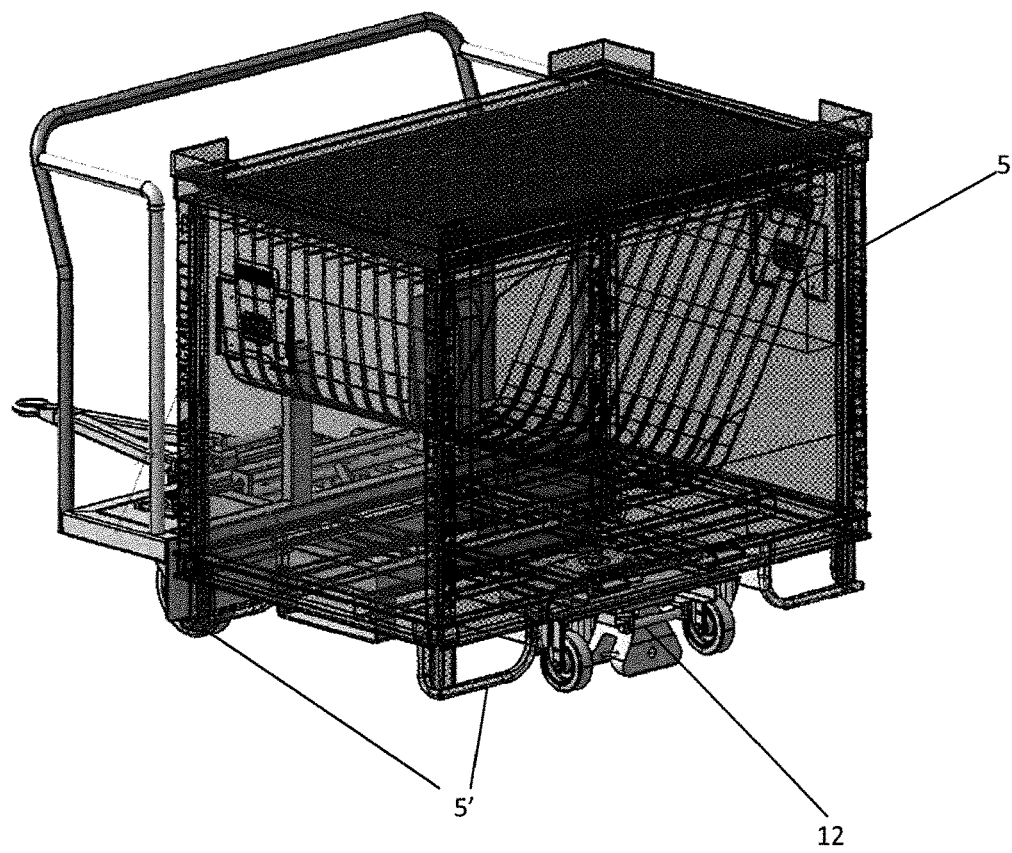
FIG. 6 shows a rear axonometric view of the lowered bidirectional trolley in a working configuration.
Figure 7:
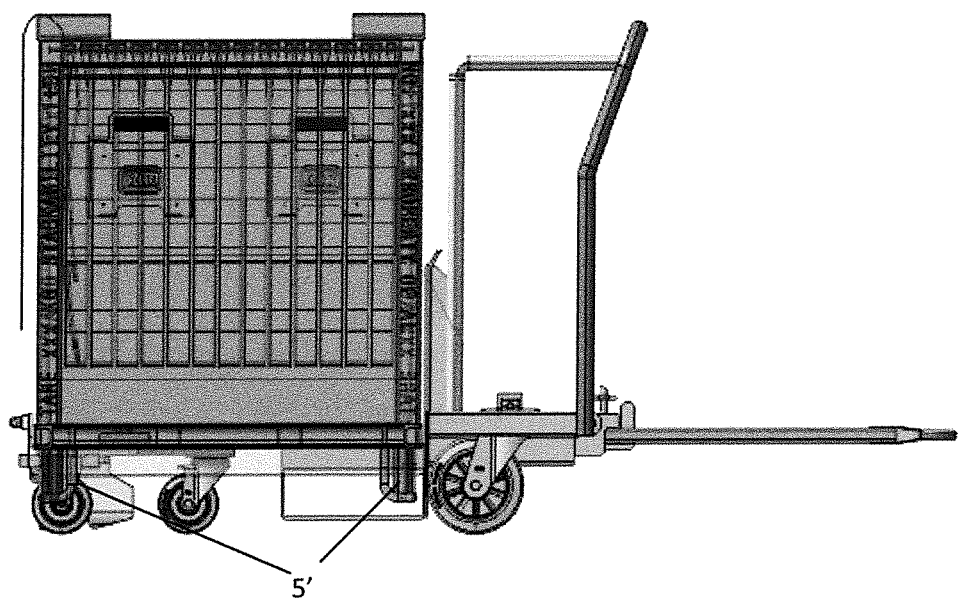
FIG. 7 shows a side view of the lowered bidirectional trolley of FIG. 6.

With reference to the above figures, the subject of the present invention is a lowered bidirectional trolley 1. said trolley 1 permits to move the containers at a height of 50 mm from the ground, instead of 250 mm, maintaining at the same time the height of the hook at the common height of 200 mm. the trolley 1 comprises a front movable drawbar 2, a push handle 3 and a loading and unloading plan 4, on which a box for moving items 5 is placed, as can be seen in FIGS. 6 and 7, the box 5 is placed on the trolley 1, such as its support feet 5' on the ground are external to the plan 4.

Within the whole present description, with "front side of the trolley" is the side proximate to the push handle 3, whereas the rear side is the one distal to the push handle 3. it is clear, on the other hand, as left side and right side of the trolley the ones corresponding to the arms of an operator, placed in a rear position, with respect to the same trolley, and which handles the handle 3.

The drawbar 2 comprises two front wheels 6, 6' which are pivoting and a pedal of the brake 7, acting on the blocking mechanism of the front pivoting wheels, by means of a system of levers, connecting rods and cams, of the known type, and therefore it is not shown in the annexed figures.

The rear part of the trolley 1 comprises a rotary system 10, comprising three wheels 8, 8', and 8" mounted on a plate 11. such rotary system 10 comprises two non-pivoting wheels 8' and 8". placed on the same horizontal axis, and a pivoting wheel 8, placed at 45° with respect to the other two wheels 8', 8".

Figure 4:
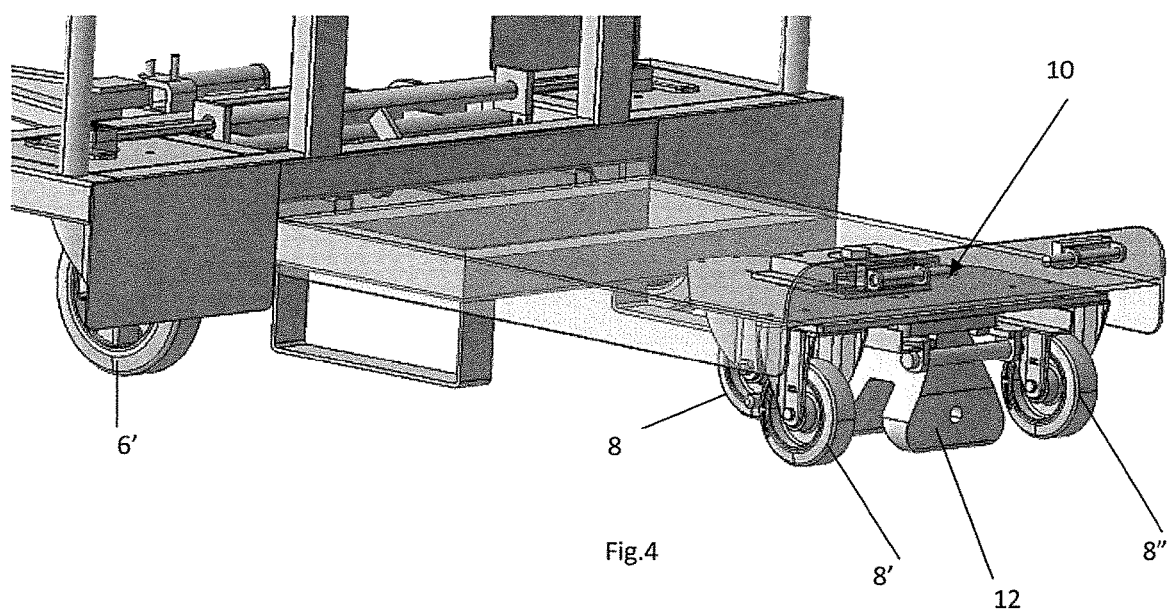
FIG. 4 shows an rear axonometric view of the lowered bidirectional trolley highlighting the detail of the rear hook.
Figure 5:
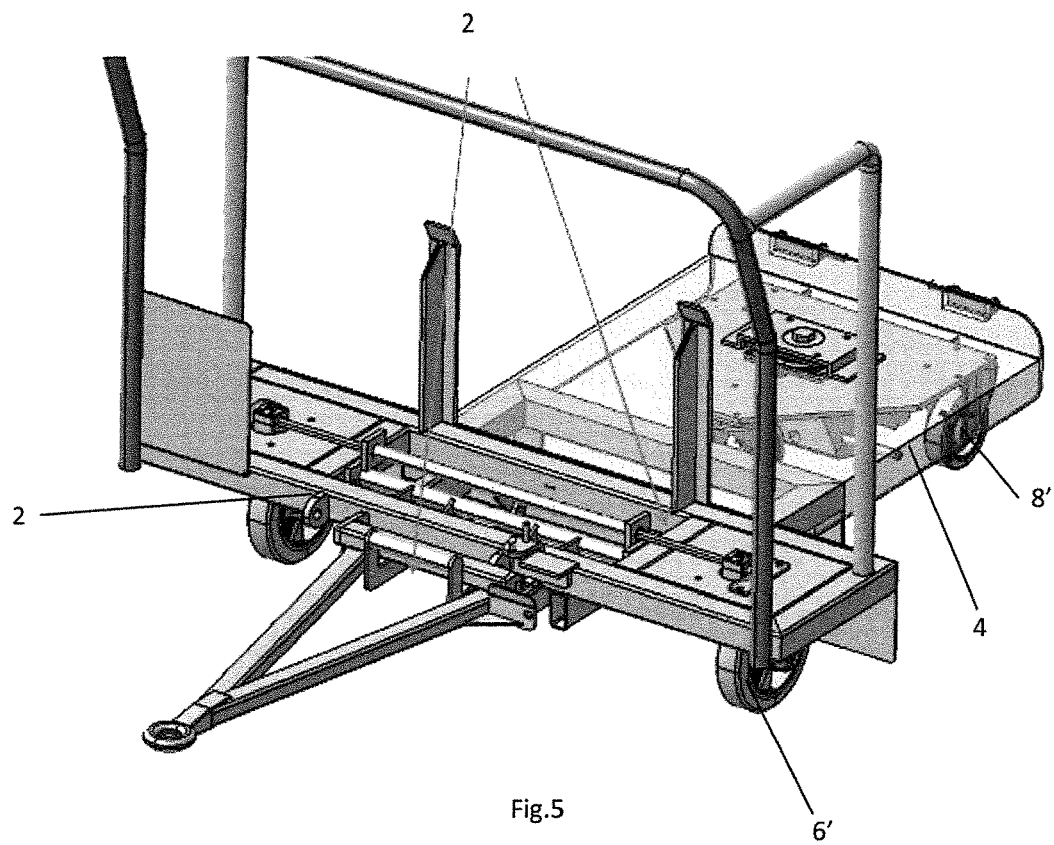
FIG. 5 shows a front axonometric view of the lowered bidirectional trolley.

The rotary system 10 also comprises a hook 12 directly connected with the plan 4, in a working position, such hook 12 takes a resting position in which it is retracted under the plan 4, between the two wheels 8' and 8", as shown in FIG. 4. in such resting position, as shown in FIGS. 6 and 7, the rear part of the trolley 1 is completely free, and the operator is able easily to approach the box 5, in order to perform the unloading of the box 5 itself.

Figure 1:
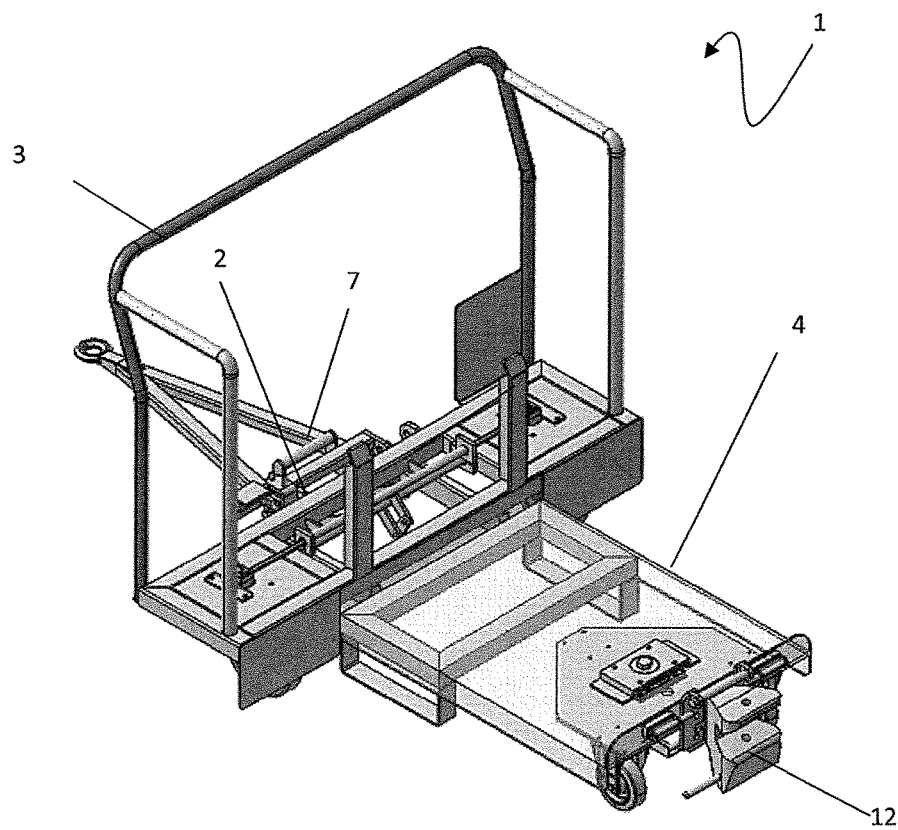
FIG. 1 is an axonometric assembly view of the lowered bidirectional trolley according to an embodiment of the present invention.
Figure 2:
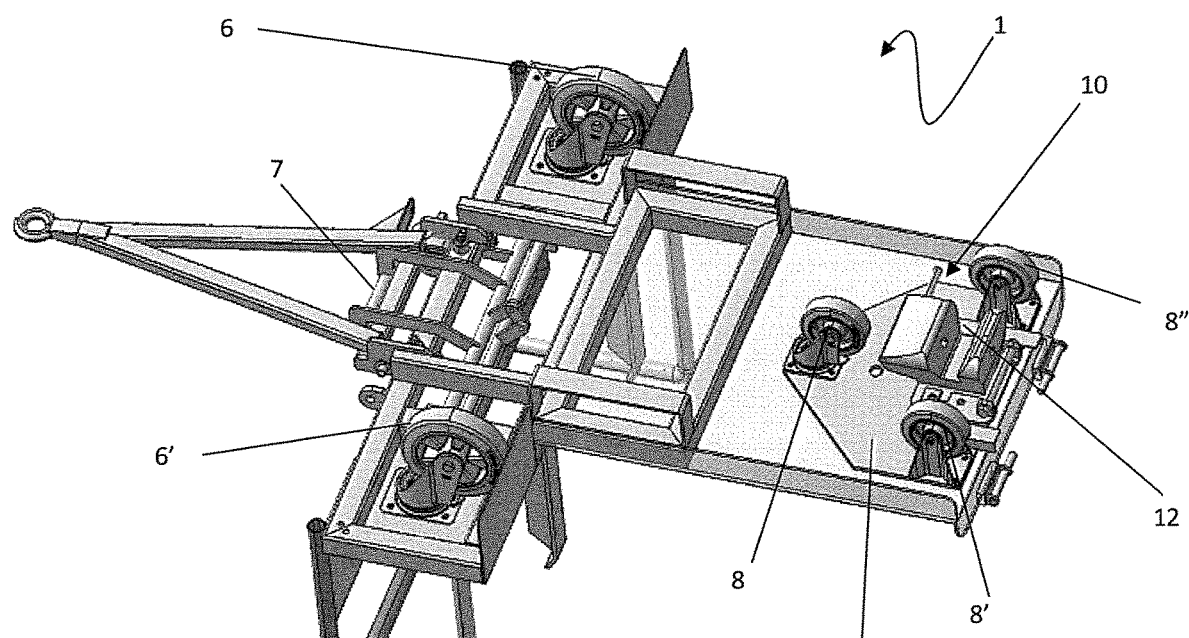
FIG. 2 is a plan view from below of the lowered bidirectional trolley of FIG. 1.
Figure 3:
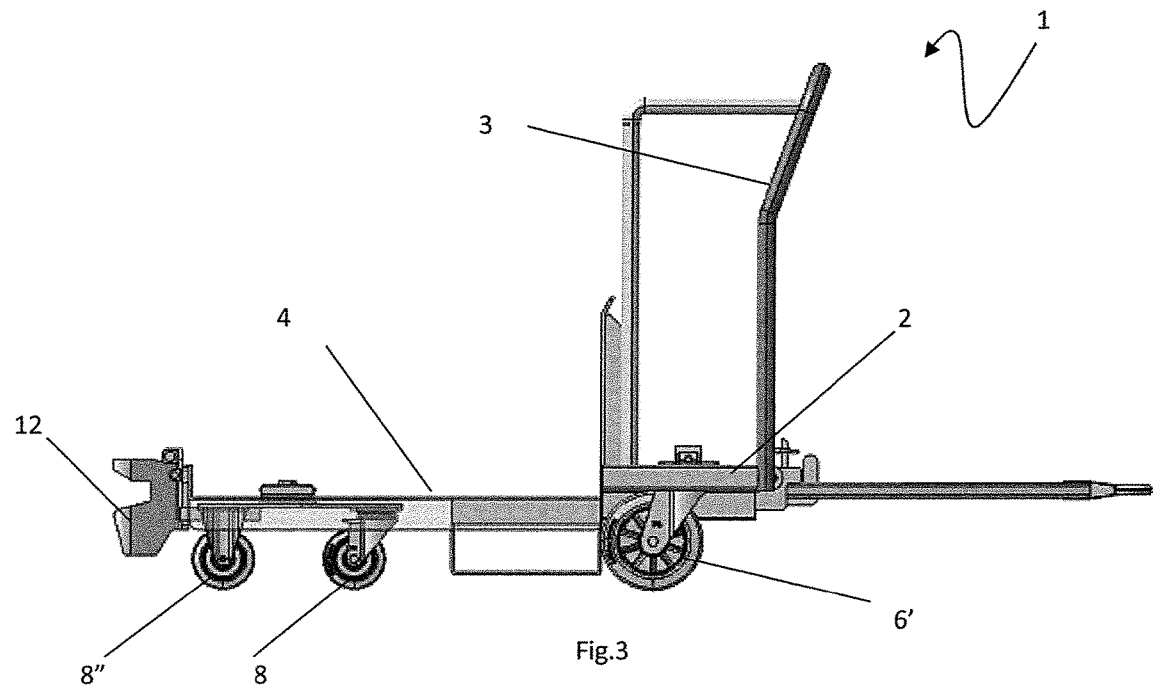
FIG. 3 is a side view of the lowered bidirectional trolley with the application of a rear hook.

In a working position, the hook 12 is extracted and taken at the height of the plan 4. in such position, as shown in FIG. 3, the trolley can be connected to a second trolley, to be inserted in series in a sequence of trolleys, in the working position, the hook 12 is fixed to the trolley, as shown in FIG. 3, which avoids a rotation of the rotary system 10. in other words, it is avoided the rotation both of the non pivoting wheels 8' and 8", and of the pivoting wheel 8. when the hook 12 is inserted in the working position, the rotary system 10 can be actuated, and both the non pivoting wheels 8' and 8" and the pivoting wheel 8, and to permit a lateral translation of the trolley 1. the push handle 3 fixed on the drawbar 2 permits the handling and the pushing of the trolley 1 in the desired direction, in the translating and positioning step of the trolley in working areas with few space or bound, it is therefore sufficient a single maneuver, the steering of the trolley is made without moving the same.

Although at least one exemplary embodiment has been presented in the summary and in the detailed description, it must be understood that there exists a large number of variants falling within the scope of protection of the invention, furthermore, it must be understood that the embodiment or the embodiments presented are only examples that do not intend to limit in any way the scope of protection of the invention or its application or configurations, on the contrary, the brief description and the detailed description provide the skilled man with a convenient guide for implementing at least one exemplary embodiment, as it is clear that numerous variations can be made in the function and assembly of the elements described therein, without departing from the scope of protection of the invention as established by the attached claims and their technical-legal equivalents.

The invention claimed is:

1. A bidirectional trolley (1) comprising a drawbar (2), two pivoting front wheels (6, 6') a push handle (3), a loading and unloading plan (4) for a box (5) for handling items, which comprises a handling system (10) placed in the rear part of the bidirectional trolley (1), and comprising two non-pivoting wheels (8', 8") placed on the same horizontal axis, a pivoting wheel (8), placed at 45° with respect to two other non-pivoting wheels (8', 8") and a hook (12), configured to assume a resting position in which it is completely retracted under the plan (4), between the two non-pivoting wheels (8' and 8"), in order to permit to an operator to approach the box for moving items in the best way, for an easy loading and unloading of the box (5) itself.

2. The bidirectional trolley (1) according to claim 1, wherein the hook (12) is configured for being extracted in a working position and taken at the height of a plan (4), to permit to hook a second trolley (1).

3. The bidirectional trolley (1) according to claim 1, is configured in such a way that when the hook (12) is in a working position, the rotation both of the two non-pivoting wheels (8' and 8") and of the pivoting wheel (8) by an angle of 90° is avoided.

4. The bidirectional trolley (1) according to claim 1, is configured in such a way that when the hook (12) is in a resting position, they can rotate both the two non-pivoting wheels (8 and 8") and the pivoting wheel (8), and to permit a lateral translation of the bidirectional trolley (1) itself.

5. The bidirectional trolley (1) according to claim 1, wherein said drawbar (2) comprises a pedal of a brake (7) which acts on a blocking mechanism of the front pivoting wheels (6, 6').

* * * * *